United States Patent [19]

Pradel et al.

[11] Patent Number: 5,794,743
[45] Date of Patent: Aug. 18, 1998

[54] SHOCK ABSORBER OR VIBRATION DAMPER

[75] Inventors: Robert Pradel, Heidenfeld; Manfred Angles, Oerlenbach, both of Germany

[73] Assignee: Fichtel & Sachs AG, Schweinfurt, Germany

[21] Appl. No.: 628,863

[22] Filed: Apr. 5, 1996

[30] Foreign Application Priority Data

Apr. 8, 1995 [DE] Germany .......................... 195 13 469.9

[51] Int. Cl.[6] ...................................................... F16F 9/36
[52] U.S. Cl. ........................................................ 188/322.16
[58] Field of Search ........................... 188/282.1, 282.2, 188/282.3, 282.4, 282.5, 282.6, 315, 322.16, 322.17, 322.18, 322.19, 322.22

[56] References Cited

U.S. PATENT DOCUMENTS

| 3,263,983 | 8/1966 | Bliven . |
| 3,661,236 | 5/1972 | Wossner ..................... 188/322.17 |
| 4,164,673 | 8/1979 | Mazzorana . |
| 4,438,834 | 3/1984 | Handke et al. .............. 188/322.17 |
| 4,527,781 | 7/1985 | Pees et al. ..................... 188/315 |
| 5,224,573 | 7/1993 | Amemiya et al. . |
| 5,570,763 | 11/1996 | Pavejo ........................... 188/315 |

FOREIGN PATENT DOCUMENTS

| 2063584 | 7/1971 | France . |
| 2695446 | 3/1994 | France . |
| 1032608 | 6/1958 | Germany . |
| 2659137 | 6/1978 | Germany . |
| 2905928 | 8/1980 | Germany . |
| 3445461 | 6/1986 | Germany . |
| 3500101 | 7/1986 | Germany . |
| 3510866 | 10/1986 | Germany . |
| 4115382 | 11/1991 | Germany . |
| 1216146 | 12/1970 | United Kingdom . |
| 1404773 | 9/1975 | United Kingdom . |
| 2053411 | 2/1981 | United Kingdom . |
| 2243898 | 11/1991 | United Kingdom . |
| 3012362 | 6/1993 | WIPO .................. 188/322.17 |

*Primary Examiner*—Robert J. Oberleitner
*Assistant Examiner*—Chris Schwartz
*Attorney, Agent, or Firm*—Nils H. Ljungman and Associates

[57] ABSTRACT

A shock absorber or vibration damper with a securing element which has a ring area for the axial fixing and securing of ring-shaped components, in particular for securing guide bushings and gaskets for the piston rod of a hydraulic vibration damper. The securing element is characterized by a plurality of projections which project axially to locate and fix the position of a cylindrical body, whereby the projections extend from the ring area, and the projections are bent out of the securing element. The cylindrical body secured by the projections can possibly be the inner tube of a two-tube vibration damper or a decompression stop spring. The invention teaches that the securing element can be used to perform multiple functions in part by securing multiple components.

20 Claims, 7 Drawing Sheets

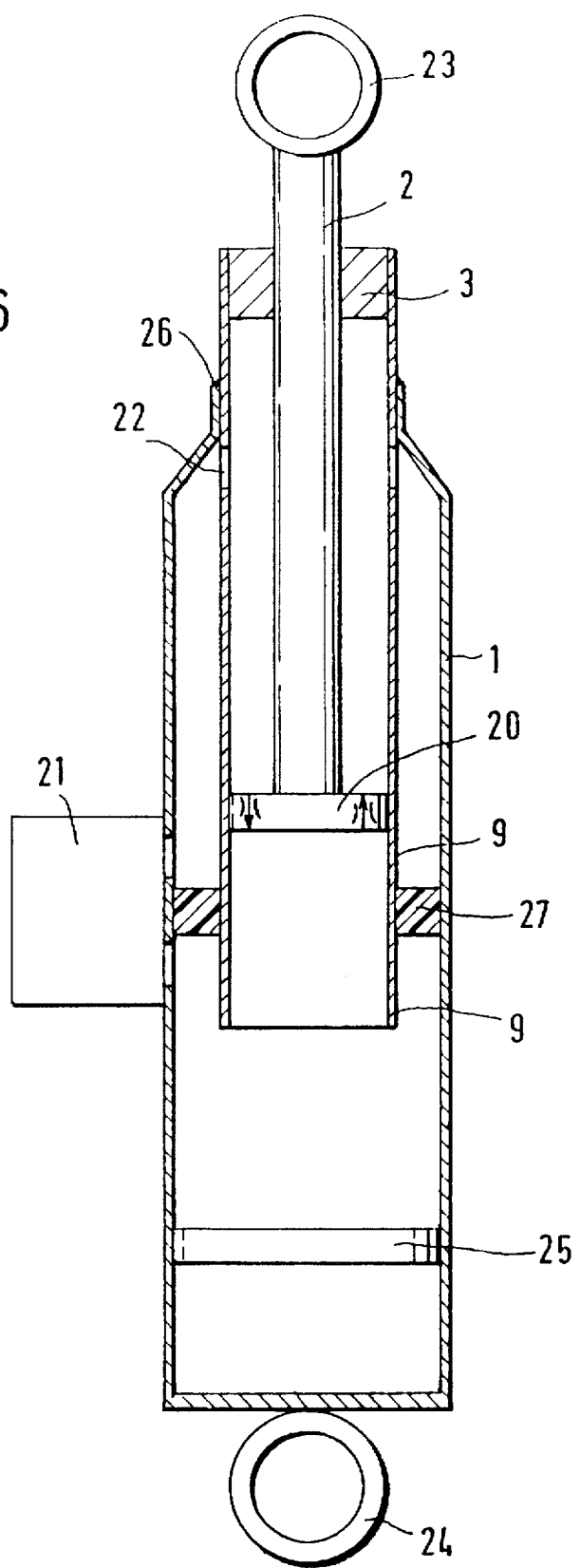

1

SHOCK ABSORBER OR VIBRATION DAMPER

BACKGROUND OF THE INVENTION

1. Field of the Invention

This invention relates to a shock absorber or vibration damper having a securing element which has a ring area for the axial fixing and securing of ring-shaped components, in particular guide bushings and gaskets for the piston rod of a hydraulic vibration damper.

2. Background Information

Such shock absorbers or vibration dampers with securing elements exist in a variety of embodiments. DE-A-41 15 382 discloses a hydraulic damper in which the guide bushings of the piston rod are fixed in place and secured by means of two sleeves which are inserted one into the other, and which are supported against one another and against an inner and outer cylinder tube respectively. As a result of the bent lower portion of the one sleeve, a ring area is realized on which the guide bushing is supported axially.

DE-C-35 00 101 discloses a two-tube damper in which a sleeve which axially fixes a spring in position is welded into the inner tube. To fix the upper winding of the spring to the sleeve, the lower edge of the sleeve is crimped. In such a realization, the quality of the weld seam which must be present on the inner tube is of critical importance, because on one hand the centering of the sleeve is a complicated process, and on the other hand, the cylinder tube may warp on account of the effects of heat, which can lead to a deterioration of the function of the vibration damper.

In adjustable single-tube dampers, it is necessary to make some provision on the upper end of the cylinder space for the overflow of oil into the outer container. For this purpose, holes are drilled in the cylinder tube. The holes must then be deburred in a complex, expensive and time-consuming process, so that the area of the tube which comes in contact with the holes and is adjacent to the holes is not damaged. The outer container (the outer tube) and the cylinder tube must be connected to one another on the upper end. That is, the outer tube and the inner cylinder tube must be connected at their upper ends; the outer container is between the two tubes. This connection is made by means of several welds, which once again involves the problems indicated above. In addition to the risk that the cylinder tube will become warped during welding, there is also the risk in such vibration dampers that the weld seam will not be absolutely tight, and damping medium will therefore escape.

The fact that the space available for the installation of such components in modern motor vehicles is becoming increasingly smaller means that the dimensions of all the components must be reduced. Costs, in particular the costs of manufacturing the components, must be continuously reduced so that the manufacturer can survive in the face of international competition. For these reasons, the goal of the development effort is increasingly to design individual components so that they can perform multiple functions, as a result of which other components can be eliminated and/or the assembly process can be simplified.

OBJECT OF THE INVENTION

The object of the invention is to improve a shock absorber or vibration damper having a securing element of the generic type described above, so that the securing element can be manufactured economically and can be used to perform multiple functions.

SUMMARY OF THE INVENTION

The securing element of the present invention is characterized by a number of projections which project axially and are used to locate and fix the position of a cylindrical body, whereby the projections extend from the ring area which faces away from the ring area which provides the support.

That is, the securing element has traditionally been used to support structures on one side of the ring area of the securing element. The projections are formed by the material of the ring area, but the projections are bent away from the side of the ring area, which side has traditionally been used to provide support, so that the projections can provide support to other components of a vibration damper, which other components are typically secured on the other side of the ring area than has traditionally been used to secure elements. Thus, the securing element of the present invention is able to secure elements on both sides of the securing element.

As a result of this configuration, the securing element can usually be used not only in the conventional manner to axially fix and secure the position of gaskets and guides on one side of the securing element, but the securing element can also perform additional securing and fixing functions by means of the projections on the opposite side, which have heretofore gone unused. For example, the inner cylinder tube of a single-tube damper can be rolled along the projections. In that case, the cylinder tube is practically suspended in the outer container. It is therefore unnecessary to weld the inner cylinder tube to the outer container, and the time required for assembly is also reduced. It is also possible to use the projections to hold the decompression stop spring of a two-tube vibration damper by means of its terminal winding, by bending the projections around the spring wire. That is, the securing element is known to be used to secure gaskets and guides on one side of the securing element, typically around the piston rod. In the present invention, the projections from the securing element allow the securing of components on the opposite side of the securing element, in addition to the known function of securing gaskets and guides.

It is advantageous if the projections are bent out of the material of which the securing element is made. The securing element can then be a shaped sheet metal part. The projections can originate from the part which is stamped out for the piston rod, by leaving the corresponding areas intact during the stamping process, or they can also be cut out of the ring area of the securing element by a corresponding stamping and cutting process. Preferably, there are three projections which are distributed around the periphery at uniform intervals. That is, the securing element has a ring portion, which ring portion surrounds the piston rod; the ring portion has an edge which edge is adjacent the piston rod. The projections can be stamped out of the ring portion. The projections can be stamped out of the ring portion to include the edge of the ring portion, so that the edge of the ring portion surrounds the piston rod in sections. Alternatively, the projections can be stamped out of the ring portion more peripherally, so that the edge of the ring portion is left intact, and therefore the edge of the ring portion surrounds the piston rod continuously.

The securing element can be realized in the form of a disc or essentially in the form of a pot which has a cylindrical wall. The pot-shaped configuration makes it possible to achieve a fastening of the securing element, e.g. on or around a guide bushing.

If the cylindrical wall is bent outward, thereby forming an additional ring area, the securing element can be pressed into the cylinder tube of a vibration damper. The additional ring area can then be used for the axial fixing of the securing element on the cylinder tube, and may also be rolled to secure the fastening to the cylinder tube.

In one particularly advantageous embodiment, the cylindrical wall is realized with a crown, which improves the radial centering of the securing element in the cylinder tube.

The bending of the projections out of the material of which the securing ring is made has the advantage that, in an adjustable single-tube damper, the resulting interruptions in the ring area can be used to create an oil overflow into the outer container at the upper end of the cylinder chamber. While the cylinder tube is fastened to the securing ring by means of the projections, a disc with corresponding recesses can be inserted between the bottom ring area of the securing element and the upper end of the cylinder tube. These recesses, in connection with the ring-shaped gap formed by the projections between the securing ring and the cylinder tube, make it possible for the oil to flow from the cylinder tube into the outer tube during an outward stroke movement of the piston in the cylinder tube. The complicated and time-consuming process of drilling and deburring the holes in the cylinder tube can therefore be eliminated, which results in a significant reduction in the time required for manufacturing.

The bending of the projections out of the material of which the securing ring is made has the advantage that, in an adjustable double-tube damper, the resulting interruptions in the ring area can be used to create an oil overflow into the outer container at the upper end of the cylinder chamber. While the cylinder tube is fastened to the securing ring by means of the projections, a disc with corresponding recesses can be inserted between the bottom ring area of the securing element and the upper end of the cylinder tube. These recesses, in connection with the ring-shaped gap formed by the projections between the securing ring and the cylinder tube, make it possible for the oil to flow from the cylinder tube into the outer tube during an outward stroke movement of the piston in the cylinder tube. The complicated and time-consuming process of drilling and deburring the holes in the cylinder tube can therefore be eliminated, which results in a significant reduction in the time required for manufacturing.

One feature of the invention resides broadly in a vibration damper for a motor vehicle, the vibration damper comprising: cylinder element comprising at least one cylindrical body; at least one of the at least one cylindrical body having an inside diameter, an outside diameter, and a length; one of the at least one cylindrical body comprising a work cylinder; piston element being movable within the work cylinder, the piston element dividing the work cylinder into two working chambers; piston rod element connected to the piston element and being movable with the piston element; the piston rod element having a longitudinal axis disposed in an axial direction along the piston rod element; element for connecting the cylinder to a first portion of a motor vehicle; element for connecting the piston rod element to a second portion of a motor vehicle; a guide bushing for guiding the piston rod element; gasket element for sealing around the piston rod element; a securing elements the securing element comprising a ring portion; the ring portion comprising element for securing the guide bushing adjacent to the piston rod element; the guide bushing being disposed on the ring portion; the guide bushing being disposed adjacent to the piston rod element; the ring portion comprising element for securing the gasket element adjacent to the piston rod element; the gasket element being disposed on the ring portion; the gasket element being disposed adjacent to the piston rod element; the securing element comprising a plurality of projections; the plurality of projections extending from the ring portion; and the plurality of projections extending substantially in the axial direction of the longitudinal axis of the piston rod element, the projections securing the at least one cylindrical body.

Another feature of the invention resides broadly in a hydraulic cylinder for a vehicle, the hydraulic cylinder comprising: cylinder element comprising at least one cylindrical body; at least one of the at least one cylindrical body having an inside diameter, an outside diameter, and a length; one of the at least one cylindrical body comprising a work cylinder; piston element for moving within the work cylinder, the piston element for dividing the work cylinder into two working chambers; piston rod element connected to the piston element and for moving with the piston element; the piston rod element having a longitudinal axis; element for connecting the cylinder element to a first portion of a vehicle; element for connecting the piston rod element to a second portion of a vehicles a securing element; the securing element comprising a ring portions the ring portion securing components adjacent to the piston rod element; the securing element comprising a plurality of projections; the plurality of projections extending from the ring portion; and the plurality of projections extending in an axial direction substantially parallel to the longitudinal axis of the piston rod element, the projections securing at least one of the at least one cylindrical body.

Yet another feature of the invention resides broadly in a securing element in a hydraulic cylinder for a motor vehicle, the hydraulic cylinder comprising: cylinder element comprising at least one cylindrical body; at least one of the at least one cylindrical body having an inside diameter, an outside diameter, and a length; one of the at least one cylindrical body comprising a work cylinder; piston element for moving within the work cylinder, the piston element for dividing the work cylinder into two working chambers; piston rod element connected to the piston element and for moving with the piston element; the piston rod element having a longitudinal axis; element for connecting the cylinder element to a first portion of a vehicle; element for connecting the piston rod element to a second portion of a vehicle; the securing element comprising; a ring portion; the ring portion securing components adjacent to the piston rod element; the securing element comprising a plurality of projections; the plurality of projections extending from the ring portion; the plurality of projections extending in an axial direction substantially parallel to the longitudinal axis of the piston rod element, the projections securing at least one of the at least one cylindrical body.

The above discussed embodiments of the present invention will be described further hereinbelow with reference to the accompanying figures.

BRIEF DESCRIPTION OF THE DRAWINGS

Several embodiments of the invention are explained in greater detail below with reference to the accompanying drawings.

FIG. 6 is a schematic diagram which illustrates the function of an adjustable vibration absorber of the prior art.

DESCRIPTION OF THE PREFERRED EMBODIMENT

Figure 1:
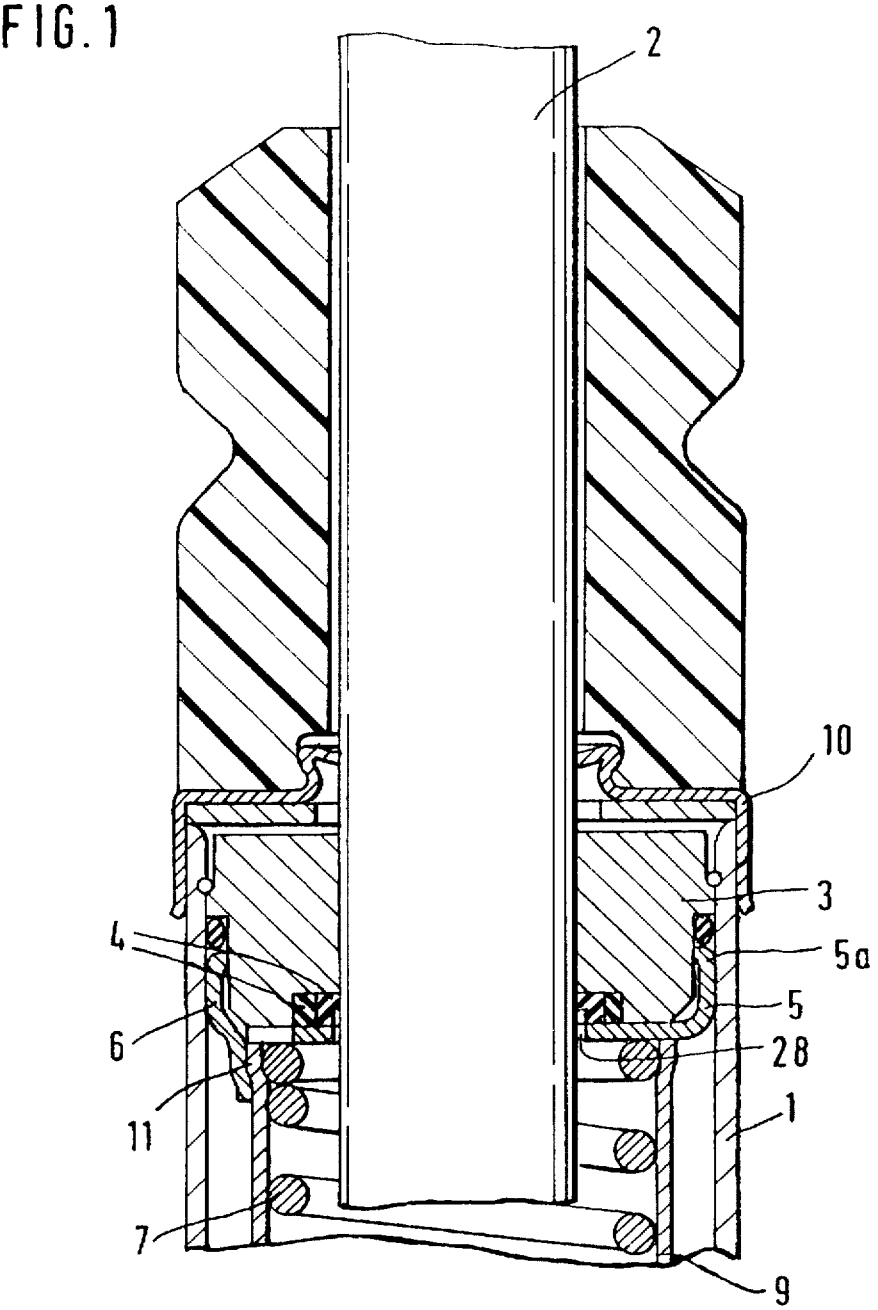
FIG. 1 shows a securing ring of the present invention as it is installed in a two-tube vibration damper.

The schematic diagram in FIG. 6 shows an inner cylinder tube 9 which is connected to an outer cylinder tube 1 by means of a weld seam 26. In the inner cylinder tube 9, a damping piston 20 is guided and is fastened to a piston rod 2 which extends out of the cylinder tube 9. A guide element 3 is located at the top of inner tube 9, which guide element 3 guides and centers piston rod 3. To adjust the damping force, there is a damping force adjustment valve 21 on the outer cylinder tube 1 which controls the flow of damping medium. This damping force adjustment valve 21 works together with a separating piston unit 25 and a gasket 27 which seals the inner cylinder tube 9 against the outer cylinder tube 1, and thereby forms two chambers. By means of holes 22, which holes 22 are provided on the upper end in the inner cylinder tube 9, the hydraulic fluid which is displaced by the damping piston 20 flows into the annular space formed between the inner cylinder tube 9 and the outer cylinder tube 1. The vibration damper is fastened by means of the fastening points 23, 24. Problems encountered on known vibration dampers include the quality of the weld seam 26, which frequently leaks, and the necessity of deburring the holes 22 in the cylinder tube 9, over which the damping piston 20 must slide.

Figure 5:
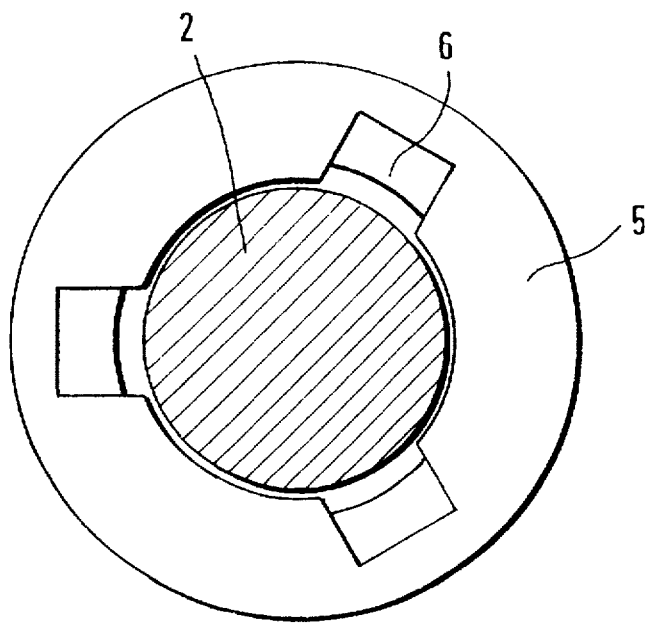
FIG. 5 shows an overhead view of a securing ring of the present invention.

FIG. 1 shows a partial section of a two-tube damper with a securing ring 5 in accordance with the present invention. The securing ring 5 is pot-shaped and has a cylindrical wall 5a, and is provided on its bottom with projections 6. The realization of these projections 6 is also illustrated in FIG. 5. The projections 6 which are uniformly distributed around the periphery of securing ring 5 are bent downward from a section 28 which is cut out for the piston rod 2. By means of corresponding bending operations—as will be explained in greater detail below—these projections 6 are then bent to form fastening tabs for additional components.

The inner cylinder tube 9 (FIG. 1) is crimped outward on its upper end. In the crimping groove thereby formed, a decompression stop spring 7 is fixed in position in the inner cylinder tube 9 by means of the top winding of spring 7. The projections 6 of the securing ring 5 are rolled around the outer curved portion of the crimp 11, so that the inner cylinder tube 9 is firmly connected to the securing ring 5. The gaskets 4 provide a radial seal around the piston rod 2. The gaskets 4 are fixed in the axial direction by means of the upper ring area of the securing element 5 as shown in the drawing. The securing element 5 is rolled around the guide element 3 and is curved outward. By means of the securing ring 5, the complete assembly, including the guide element 3, gaskets 4, and inner cylinder 9, is held by pressing the assembly, together with the decompression stop spring 7, into the outer cylinder tube 1. Since the three projections 6 are the only area missing from the ring area of the securing element 5, the axial securing of the gaskets 4 and of the guide bushings 3 is essentially guaranteed.

Similarly, for this purpose, but in contrast to the exact configuration of the projections 6 illustrated in FIG. 5, there can also be a portion cut out of the ring area, so that in any case an uninterrupted or continuous inner ring area which is essentially in direct contact with the piston rod 2 remains, so that the gaskets 4 are supported without interruptions. That is, FIG. 5 shows the projections 6 comprising the material of the securing element 5 including the inner edge which is adjacent to the piston rod 2, so that the inner edge of the securing element 5 is interrupted. Alternatively, the projections 6 can be formed by cutting a hole in the securing element 5, thereby leaving the inner edge of securing element 5 uninterrupted or continuous. The uninterrupted or continuous inner ring area of securing element 5 may not be in direct contact with the piston rod 2, but nevertheless the inner ring area of securing element 5 continuously surrounds the piston rod 2 in close proximity to the piston rod 2.

Figure 1A:
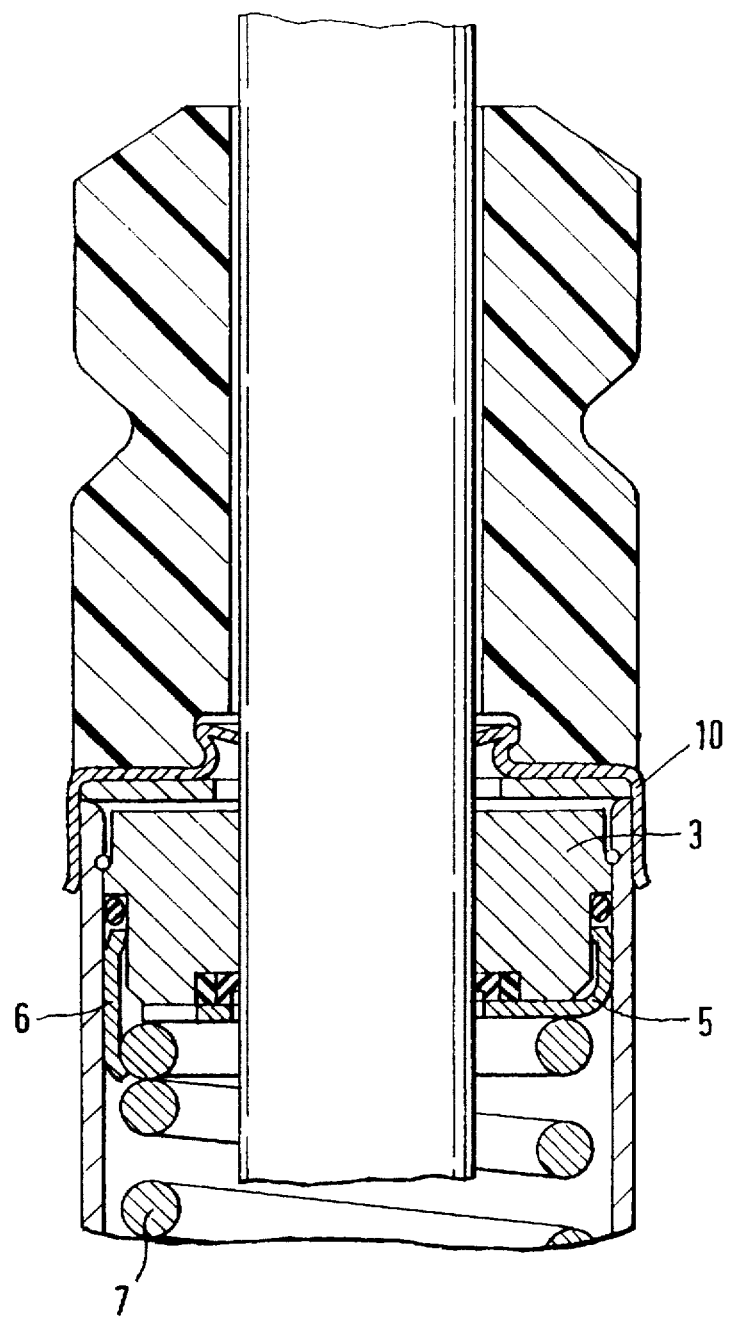
FIG. 1A shows a variant of the securing element illustrated in FIG. 1, where instead of a cylinder tube, a decompression stop spring is suspended.

FIG. 1A shows a variant of the securing element 5 illustrated in FIG. 1. FIG. 1A shows a single tube damper. In place of the suspension of an inner cylinder, in this embodiment a decompression stop spring 7 is held by the projections 6. The upper portion of the cylinder tube 1 is covered by a cap 10, as is the embodiment shown in FIG. 1.

Figure 1B:
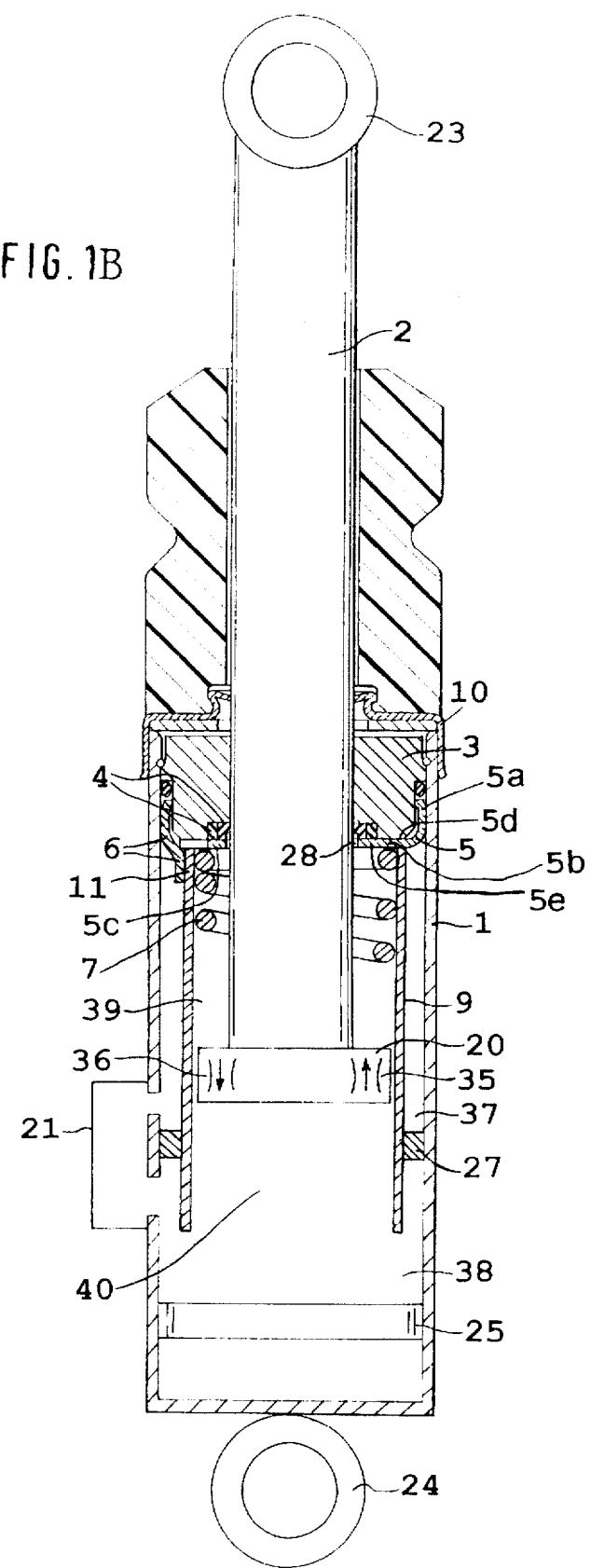
FIG. 1B shows a securing ring of the present invention installed in a two-tube vibration damper.

FIG. 1B shows a section of a two-tube damper having an inner cylinder tube 9 which is connected to an outer cylinder tube 1. In the inner cylinder tube 9, a damping piston 20 is guided and is fastened to a piston rod 2 which extends out of the cylinder tube 9. Piston 20 divides cylinder tube 9 into two working chambers, an upper working chamber 39 and a lower working chamber 40. Piston 20 has one-way damping valves 35 and 36, shown schematically in FIG. 1B. To adjust the damping force, there is a damping force adjustment valve 21 on the outer cylinder tube 1 which controls the flow of damping medium. This damping force adjustment valve 21 works together with a separating piston unit 25 and a gasket 27 which seals the inner cylinder tube 9 against the outer cylinder tube 1, and thereby forms two chambers 37 and 38. In this particular embodiment lower working chamber 40 and chamber 38 are the same chamber for most practical purposes. The vibration damper is fastened by means of the fastening points 23, 24.

FIG. 1B also shows a securing ring 5 in accordance with the present invention. The securing ring 5 is pot-shaped and has a cylindrical wall 5a, and projections 6 are provided on the bottom of cylindrical wall 5a. The realization of these projections 6 is also illustrated in FIG. 5. The projections 6 which are uniformly distributed around the periphery of securing ring 5 are bent downward towards piston 20 from a section 28 which is cut out for the piston rod 2. By means of corresponding bending operations—as will be explained in greater detail below—these projections 6 are then bent to form fastening tabs for additional components. The inner cylinder tube 9 is crimped outward on its upper end, forming the crimp 11. In the crimping groove thereby formed, a decompression stop spring 7 is fixed in position in the inner cylinder tube 9 by means of the top winding of spring 7. The projections 6 of the securing ring 5 are rolled around the outer curved portion of the crimp 11, so that the inner cylinder tube 9 is firmly connected to the securing ring 5. The gaskets 4, which gaskets 4 provide a radial seal for the piston rod 2, are held in a fixed manner in the axial direction by means of the upper surface 5d of ring area 5b of the securing element 5 as shown in the drawing. The securing element 5 is rolled around the guide element 3 and is curved outward. By means of the securing element 5, the complete assembly—which complete assembly in addition to securing element 5 consists of the guide element 3, gaskets 4, inner cylinder 9, and decompression stop spring 7—is held by pressing the assembly into the outer cylinder tube 1. Since the three projections 6 are the only area missing from the ring area 5b of the securing element 5, the axial securing of the gaskets 4 and of the guide bushing 3 is essentially guaranteed. In the embodiment of FIG. 1B, when the projections 6 are formed from the ring area 5b of securing element 5, the inner portion 5c, of ring area 5b, is left intact, so that in the embodiment of FIG. 1B inner portion 5c completely surrounds the piston rod 2, and inner portion 5c provides continuous support of gaskets 4. That is, the projections 6 are cut out of ring area 5b thereby forming holes in ring area 5b but leaving inner portion 5c intact.

FIG. 1B illustrates an important function of the present invention. Securing element 5 has the ring area 5b. The ring area 5b has an upper surface 5d, which upper surface 5d faces away from the piston 20. Opposite to the upper surface 5d, ring area 5b has lower surface 5e, which lower surface 5e faces towards piston 20. To emphasize, lower surface 5e and upper surface 5d are on opposite sides of ring area 5b. The upper surface 5d of ring area 5b secures the gaskets 4 and the guide bushing 3 adjacent upper surface 5d. The projections 6 secure the inner tube 9 adjacent the lower surface 5e. Thus, securing element 5 is able to secure elements on both the upper side and the lower side of the securing element 5.

Figure 2:
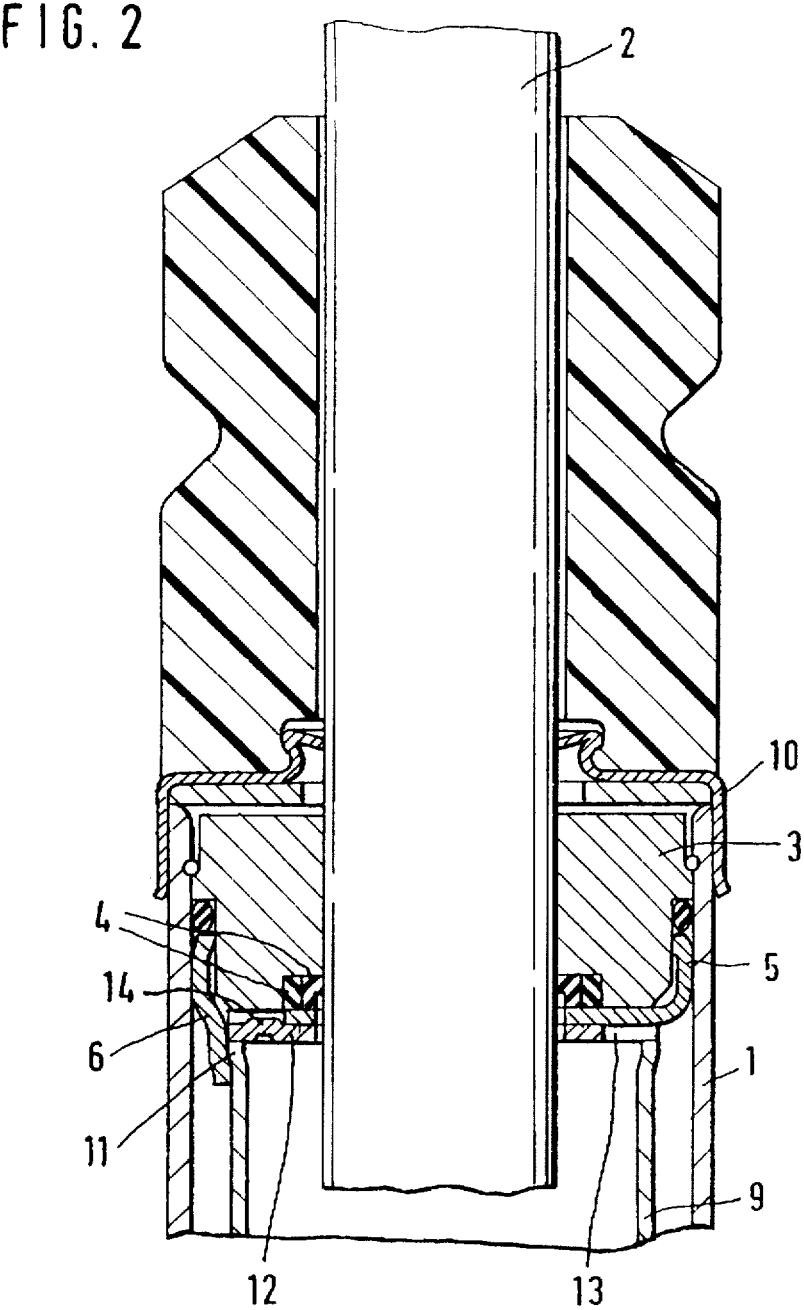
FIG. 2 shows the securing ring illustrated in FIG. 1 in a vibration damper with adjustable damping.

In the embodiment of the damper illustrated in FIG. 2, a disc 12 provided with recesses 13 is inserted between the securing element 5 and the gaskets 4. The disc 12 is supported axially on the upper edge of the inner cylinder 9, and was rolled together with the cylinder tube 9 and the projections 6 of the securing ring 5. The recesses 13 of the disc 12 are located on the radial outside of the disc 12 and together with the ring-shaped gap resulting from the projections 6, which projections 6 are bent out of the ring area, are used as an overflow for the hydraulic fluid from the inner cylinder tube 9 into the outer cylinder tube 1 in a vibration damper with adjustable damping. In this embodiment, the oil overflow can be located on the upper edge of the inner cylinder tube 9, and the damping piston 20 (not shown here) no longer passes over this area where oil overflow occurs. By using the securing ring 5 in accordance with the present invention, no holes for oil overflow need to be drilled, followed by deburring operations, in the inner cylinder tube 9. So that the disc 12 can be centered, it has elevated portions 14 which project toward the securing element 5, which elevated portions 14 are engaged in the recesses of the ring area of the securing element 5 which recesses were formed by bending out the projections 6.

Figure 3A:
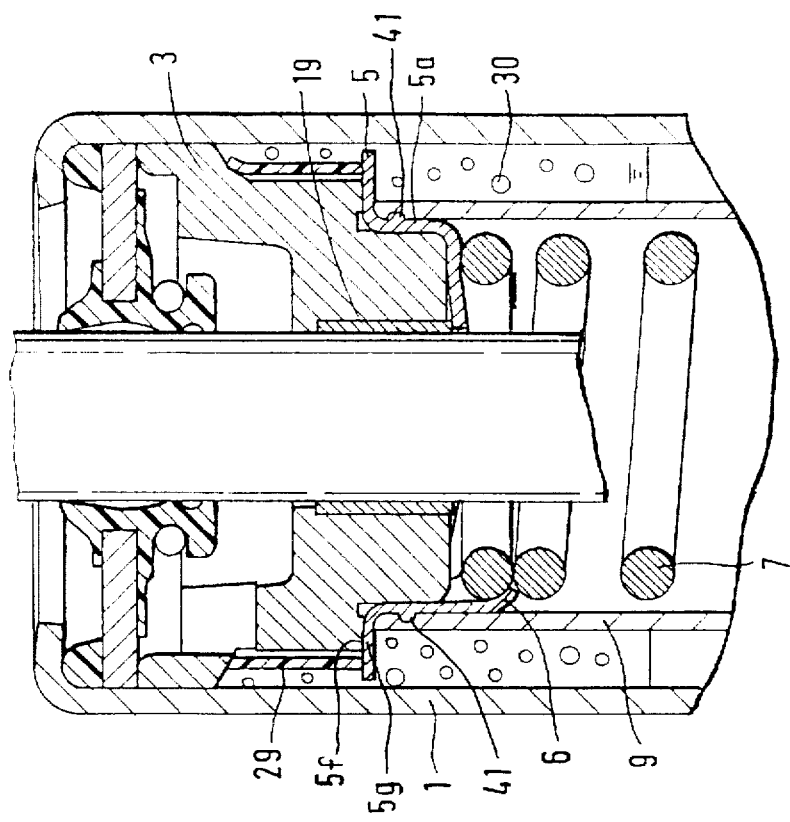
FIG. 3A shows a variant of the embodiment shown in FIG. 3.
Figure 3:
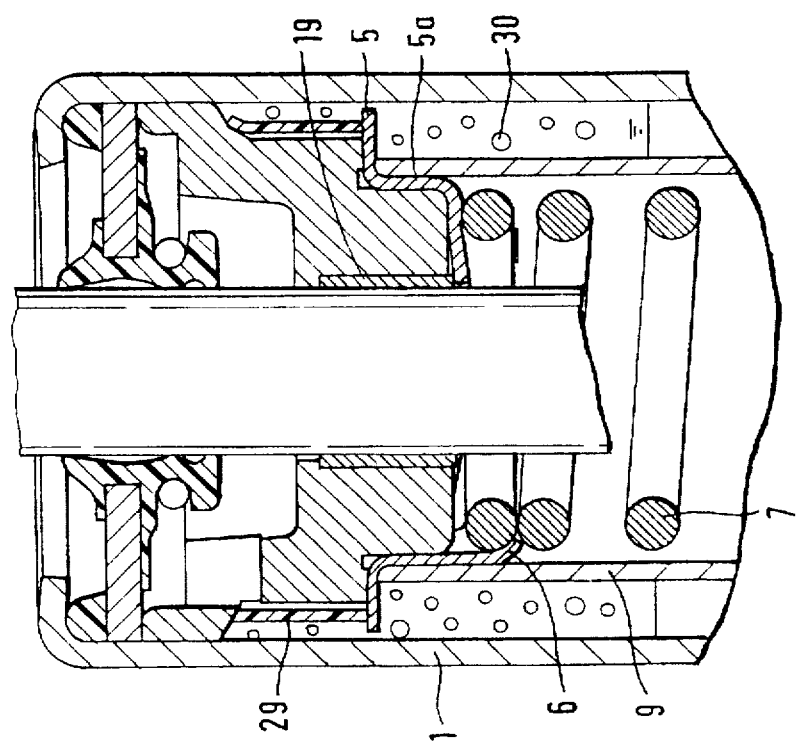
FIG. 3 shows an additional embodiment of the securing ring in a two-tube vibration damper.

FIG. 3 shows a partial longitudinal section through a two-tube vibration damper, in which the pot-shaped securing element 5 is bent outward in the upper area of the wall 5a, thereby forming an additional ring area on the top of which a return block 29 is supported. The return block 29 is necessary if a portion of the ring-shaped space between the inner cylinder tube 9 and the outer cylinder tube 1 is filled with a gas charge (see reference number 30). The ends of the projections 6 run radially inward and are used to secure a decompression stop spring 7, which decompression stop spring 7 is inserted and is supported on the bottom ring area of the securing element 5 by means of the terminal winding of the spring 7. Tabs of different shapes can be cut and bent out of the ring area of the securing ring 5, so that in addition to the suspension of the decompression stop spring 7, it is also possible to support a guide bushing 19.

FIG. 3A shows the embodiment of FIG. 3 with the addition of a spherical crown which takes the form of spherical projections or tabs 41, which spherical tabs 41 extend outwardly from the external surface of cylindrical wall 5a. The spherical tabs 41 are dispersed around the circumference of the external surface of cylindrical wall 5a to form a spherical crown. When securing element 5 is forced into inner tube 9, the spherical tabs 41 engage the inner wall of inner tube 9 via frictional forces of a force fit arrangement. The force fit arrangement of the spherical crown and the inner tube 9 improves the radial centering of securing element 5 with respect to inner tube 9. An alternative embodiment (not pictured) includes spherical tabs 41 extending from the inner surface of cylindrical wall 5a, thereby helping securing element 5 engage guide element 3. An additional embodiment (not pictured) includes spherical tabs 41 extending from an upper surface 5f of a second ring portion 5g of securing element 5, thereby engaging the lower edge of return block 29, and thereby centering return block 29 with respect to securing element 5.

Figure 4:
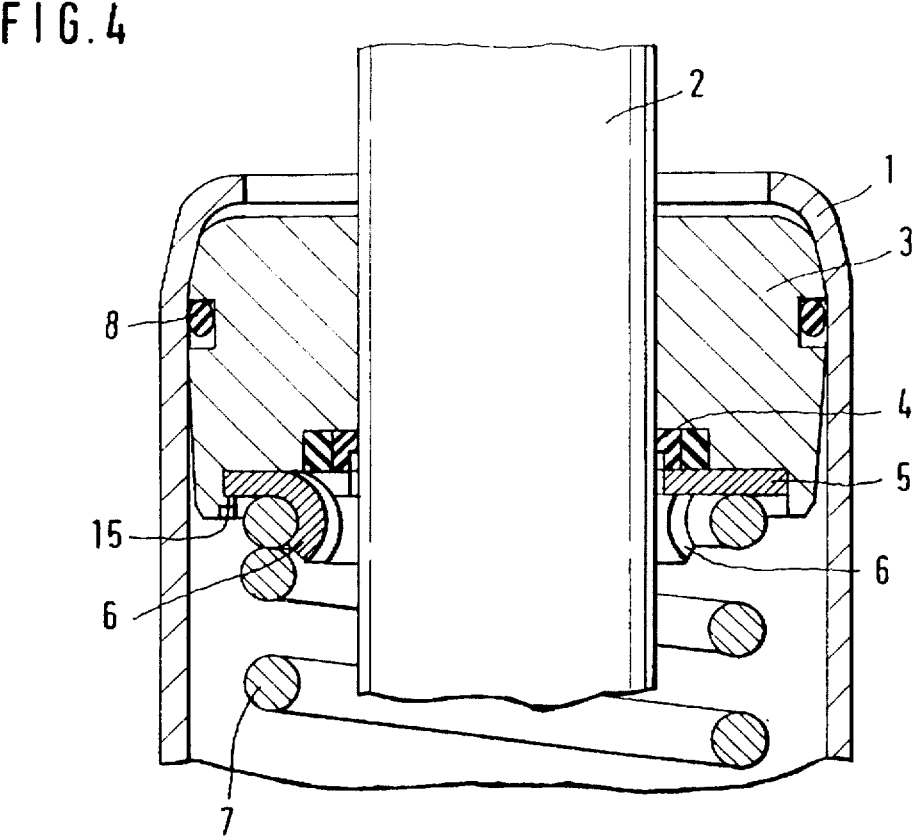
FIG. 4 shows an additional embodiment of a securing element in a single-tube vibration damper.

FIG. 4 illustrates an alternative configuration of the element 5, which in this case is realized in the form of a disc. The guide element 3 is fixed in position by rolling the upper portion of the cylinder tube 1 inward. The external contour of the guide element 3 is slightly conical, so that as a result of the rolling, there is an interlocking or positive connection between the guide element 3 and the cylinder tube 1, which thereby essentially guarantees that there will be no change in the axial position of the guide bushing 3. In the lower portion, the guide bushing 3 is provided with an undercut or recess 15, in which the securing element 5 is inserted. As explained above, the gaskets 4 are supported axially on the ring area of the securing element 5. The projections 6 are bent outward and are used to hold the decompression stop spring 7.

One feature of the invention resides broadly in the securing element 5 which has a ring area for the axial fixing and securing of ring-shaped components, in particular guide bushings 3 and gaskets 4 for the piston rod 2 of a hydraulic vibration damper, characterized by a plurality of axially-projecting projections 6 to locate and fix in position a cylindrical body 7, 9, whereby the projections 6 extend from the ring area which faces away from the ring area which provides the support, and are bent out of the securing element 5.

Another feature of the invention resides broadly in the securing element characterized by the fact that there are three projections 6 distributed at equal intervals over the periphery.

Yet another feature of the invention resides broadly in the securing element characterized by the fact that it is realized essentially in the shape of a pot with a cylindrical wall 5a.

Still another feature of the invention resides broadly in the securing element characterized by the fact that it is realized essentially in the shape of a disc.

A further feature of the invention resides broadly in the securing element characterized by the fact that the wall 5 is bent outward, forming an additional ring area.

Another feature of the invention resides broadly in the securing element characterized by the fact that the wall 5 has a spherical crown.

Yet another feature of the invention resides broadly in the securing element characterized by the fact that the projections 6 are tapered outward.

Still another feature of the invention resides broadly in the securing element characterized by the fact that the cylindrical body is the inner cylinder tube 9 of a two-tube vibration damper.

A further feature of the invention resides broadly in the securing element characterized by the fact that the cylindrical body is a decompression stop spring 7 of a vibration damper.

In the embodiment illustrated in FIG. 1B, as many features as possible of a two-tube damper have been shown for convenience. It is possible that some of the features are not needed to form a functional two-tube damper in the embodiment of FIG. 1B, but the features are shown in FIG. 1B because the embodiments illustrated in the other figures may be able to make use of the features shown in FIG. 1B.

Examples of shock absorbers or vibration dampers can be found in the following U.S. Pat. Nos. 5,386,892 entitled "Hydraulic shock absorber with shutters"; 5,396,973 entitled "Variable shock absorber with integrated controller, actuator and sensors", 5,400,245 entitled "Shock absorber having controlled damping force characteristics for use in a suspension system of a vehicle"; 5,400,877 entitled "Two-tube shock absorber"; 5,409,088 entitled "Shock absorber"; 5,413,195 entitled "Shock absorber"; 5,423,402 entitled "Twin-pipe shock absorber"; 5,464,079 entitled "Two-tube shock absorber"; and 5,467,852 entitled "Twin-pipe shock absorber".

Examples of spherical crowns for engaging other surfaces can be found in the following U.S. Pat. Nos. 5,240,289 entitled "Plug-type connection for a tubular body"; and 5,415,327 entitled "Dispensing jar with a pumping and actuating cap".

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for a motor vehicle, said vibration damper comprising:
    at least one cylindrical body;
    said at least one cylindrical body comprising a work cylinder;
    a piston being movable within said work cylinder, said piston dividing said work cylinder into two working chambers;
    a piston rod connected to said piston and being movable with said piston;
    said piston rod having a longitudinal axis disposed in an axial direction along said piston rod;
    an arrangement for connecting said work cylinder to a first portion of a motor vehicle;
    an arrangement for connecting said piston rod to a second portion of a motor vehicle;
    a guide bushing for guiding said piston rod;
    a gasket for sealing around said piston rod;
    a securing element;
    said securing element comprising a ring portion;
    said ring portion comprising an arrangement for securing said guide bushing adjacent to said piston rod;
    said guide bushing being disposed on said ring portion;
    said guide bushing being disposed adjacent to said piston rod;
    said ring portion comprising an arrangement for securing said gasket adjacent to said piston rod;
    said gasket being disposed on said ring portion;
    said gasket being disposed adjacent to said piston rod;
    said securing element comprising a plurality of projections;
    said plurality of projections extending from said ring portion;
    said plurality of projections extending substantially in the axial direction of the longitudinal axis of said piston rod; and
    said plurality of projections being configured and disposed to extend from said ring portion towards said piston to engage the outer circumference of said at least one cylindrical body to secure said at least one cylindrical body to said guide bushing.

2. The vibration damper according to claim 1, wherein:
    said ring portion comprises a first major surface, said first major surface is substantially transverse to the longitudinal axis of said piston rod; and
    said ring portion comprises a second major surface, said second major surface is substantially transverse to the longitudinal axis of said piston rod, and said second major surface is opposite to said first major surface.

3. The vibration damper according to claim 2, wherein:
    said plurality of projections are bent from said securing element;
    said first major surface faces away from said piston;
    said guide bushing and said gasket are disposed on said first major surface of said ring portion;
    said second major surface faces towards said piston; and
    said plurality of projections are bent towards said piston.

4. The vibration damper according to claim 3, wherein:
    said plurality of projections secure a sole one of said at least one cylindrical body.

5. The vibration damper according to claim 4, wherein:
    said first major surface of said ring portion has a periphery; and
    said plurality of projections are equally spaced around the periphery of said first major surface of said ring portion.

6. The vibration damper according to claim 5, wherein:
    said securing element comprises a cylindrical wall portion; and
    said cylindrical wall portion is substantially parallel to the longitudinal axis of said piston rod.

7. The vibration damper according to claim 6, wherein:
    said securing element has a central longitudinal axis;
    said cylindrical wall portion comprises a first end and a second end;
    said first end is adjacent to said ring portion;
    said second end is opposite said ring portion;
    a portion of said cylindrical wall portion adjacent to said second end is bent to form a second ring portion, said second ring portion extends away from the central longitudinal axis of said securing element; and
    said second ring portion is substantially transverse to the longitudinal axis of said piston rod.

8. The vibration damper according to claim 7, wherein said cylindrical wall portion comprises at least one substantially spherical tab.

9. The vibration damper according to claim 6, wherein:
    said plurality of projections diverges away from the central longitudinal axis of said securing element; and
    said plurality of projections comprises three projections.

10. The vibration damper according to claim 6, wherein:
    said at least one cylindrical body comprises an outer cylinder;

said work cylinder comprises an inner cylinder;

said inner cylinder is disposed within said outer cylinder; and said plurality of projections securing said at least one cylindrical body comprises a plurality of projections securing said inner cylinder.

11. The vibration damper according to claim 6, wherein:

said at least one cylindrical body comprises a decompression stop spring; and said plurality of projections securing said at least one cylindrical body comprises a plurality of projections securing said decompression stop spring.

12. The vibration damper according to claim 5, wherein said securing element is substantially disc-shaped.

13. A hydraulic cylinder for a vehicle, said hydraulic cylinder comprising:

at least one cylindrical body;

said at least one cylindrical body comprising a work cylinder;

a piston for moving within said work cylinder, said piston for dividing said work cylinder into two working chambers;

a piston rod connected to said piston and for moving with said piston;

said piston rod having a longitudinal axis;

an arrangement for connecting said work cylinder to a first portion of a vehicle;

an arrangement for connecting said piston rod to a second portion of a vehicle;

a securing element;

said securing element comprising a ring portion;

said ring portion securing a guide bushing adjacent to said piston rod;

said securing element comprising a plurality of projections;

said plurality of projections extending from said ring portion; and said plurality of projections extending in an axial direction substantially parallel to the longitudinal axis of said piston rod; and said plurality of projections being configured and disposed to extend from said ring portion towards said piston to engage the outer circumference of said at least one cylindrical body to secure said at least one cylindrical body to said guide bushing.

14. The hydraulic cylinder according to claim 13, wherein:

said ring portion comprises a first major surface, said first major surface is substantially transverse to the longitudinal axis of said piston rod;

said ring portion comprises a second major surface, said second major surface is substantially transverse to the longitudinal axis of said piston rod, and said second major surface is opposite to said first major surface;

said plurality of projections are bent from said securing element;

said first major surface faces away from said piston;

said components adjacent to said piston rod are disposed on said first major surface of said ring portion;

said second major surface faces towards said piston; and said plurality of projections are bent towards said piston.

15. The hydraulic cylinder according to claim 14, wherein:

said plurality of projections secure a sole one of said at least one cylindrical body;

said first major surface of said ring portion has a periphery;

said plurality of projections are equally spaced around the periphery of said first major surface of said ring portion;

said securing element comprises a cylindrical wall portion;

said cylindrical wall portion is substantially parallel to the longitudinal axis of said piston rod;

said components adjacent to said piston rod comprise a guide bushing for guiding said piston rod;

said components adjacent to said piston rod comprise a gasket for sealing around said piston rod;

said first major surface of said ring portion comprises an arrangement for securing said guide bushing adjacent to said piston rod;

said guide bushing is disposed adjacent to said piston rod;

said first major surface of said ring portion comprises an arrangement for securing said gasket adjacent to said piston rod;

said gasket is disposed adjacent to said piston rod;

said securing element has a central longitudinal axis;

said cylindrical wall portion comprises two ends;

said first end is adjacent to said ring portion;

said second end is opposite said ring portion;

said plurality of projections comprises three projections;

said at least one cylindrical body comprises an outer cylinder;

said work cylinder comprises an inner cylinder;

said inner cylinder is disposed within said outer cylinder; and said plurality of projections securing said at least one cylindrical body comprises a plurality of projections securing said inner cylinder.

16. The vibration damper according to claim 14, wherein:

said components adjacent to said piston rod comprise a guide bushing for guiding said piston rod;

said components adjacent to said piston rod comprise a gasket for sealing around said piston rod;

said first major surface of said ring portion comprises an arrangement for securing said guide bushing adjacent to said piston rod;

said guide bushing is disposed adjacent to said piston rod;

said first major surface of said ring portion comprises an arrangement for securing said gasket adjacent to said piston rod;

said gasket is disposed adjacent to said piston rod;

said securing element is substantially disc-shaped;

said at least one cylindrical body comprises a decompression stop spring; and said plurality of projections securing said at least one cylindrical body comprises a plurality of projections securing said decompression stop spring.

17. A securing element in combination with a hydraulic cylinder for a motor vehicle, said hydraulic cylinder comprising: at least one cylindrical body; said at least one cylindrical body comprising a work cylinder; a piston for moving within said work cylinder, the piston for dividing the work cylinder into two working chambers; a piston rod connected to the piston and for moving with the piston; the piston rod having a longitudinal axis; an arrangement for connecting the work cylinder to a first portion of a vehicle; an arrangement for connecting the piston rod to a second portion of a vehicle; said securing element comprising:

a ring portion;

said ring portion being disposed to secure a guide bushing adjacent to the piston rod;

said securing element comprising a plurality of projections;

said plurality of projections extending from said ring portion;

said plurality of projections extending in an axial direction substantially parallel to the longitudinal axis of the piston rod; and said plurality of projections being configured and disposed to extend from said ring portion towards said piston to engage the outer circumference of said at least one cylindrical body to secure said at least one cylindrical body to said guide bushing.

18. The securing element according to claim 17, wherein:

said ring portion comprises a first major surface, said first major surface is substantially transverse to the longitudinal axis of the piston rod;

said ring portion comprises a second major surface, said second major surface is substantially transverse to the longitudinal axis of the piston rod, and said second major surface is opposite to said first major surface;

said plurality of projections are bent from said securing element;

said first major surface faces away from said piston;

said first major surface of said ring portion is disposed to secure the components adjacent to the piston rod;

said second major surface faces towards said piston; and said plurality of projections are bent towards said piston.

19. The securing element of claim 18, wherein the at least one cylindrical body comprises an outer cylinder; the work cylinder comprises an inner cylinder; and the inner cylinder is disposed within the outer cylinder; wherein:

said plurality of projections secure a sole one of the at least one cylindrical body;

said first major surface of said ring portion has a periphery;

said plurality of projections are equally spaced around the periphery of said first major surface of said ring portion;

said securing element comprises a cylindrical wall portion;

said cylindrical wall portion is substantially parallel to the longitudinal axis of the piston rod;

said first major surface of said ring portion disposed to secure the components adjacent to the piston rod comprises an arrangement securing a guide bushing adjacent to the piston rod;

said first major surface of said ring portion disposed to secure the components adjacent to the piston rod comprises an arrangement securing a gasket adjacent to the piston rod;

said securing element has a central longitudinal axis;

said cylindrical wall portion comprises two ends;

said first end is adjacent to said ring portion;

said second end is opposite said ring portion;

said plurality of projections comprises three projections; and said plurality of projections securing a sole one of the at least one cylindrical body comprises a plurality of projections securing the inner cylinder.

20. The securing element according to claim 18, wherein the at least one cylindrical body comprises a decompression stop spring; wherein:

said first major surface of said ring portion disposed to secure the components adjacent to the piston rod comprises an arrangement securing a guide bushing adjacent to the piston rod;

said first major surface of said ring portion disposed to secure the components adjacent to the piston rod comprises an arrangement securing a gasket adjacent to the piston rod;

said securing element is substantially disc-shaped; and said plurality of projections securing at least one of the at least one cylindrical body comprises a plurality of projections securing the decompression stop spring.

* * * * *

UNITED STATES PATENT AND TRADEMARK OFFICE
CERTIFICATE OF CORRECTION

PATENT NO. : 5,794,743
DATED : August 18, 1998
INVENTOR(S) : Robert PRADEL and Manfred ANGLES It is certified that error appears in the above-identified patent and that said Letters Patent is hereby corrected as shown below:

In column 3, line 60, after the first occurrence of 'securing', delete "elements" and insert --element;--.

In column 4, line 21, after the first occurrence of 'a', delete "vehicles" and insert --vehicle;--.

In column 4, line 22, after the first occurrence of 'ring', delete "portions" and insert --portion;--.

In column 7, line 21, after 'surface', delete "Se" and insert --5e--.

Signed and Sealed this

Twenty-fifth Day of May, 1999

Q. TODD DICKINSON

Attest:

Attesting Officer

Acting Commissioner of Patents and Trademarks